April 18, 1967 — T. G. BROWN — 3,314,674
PIPE STAND
Filed Jan. 29, 1965 — 2 Sheets-Sheet 1
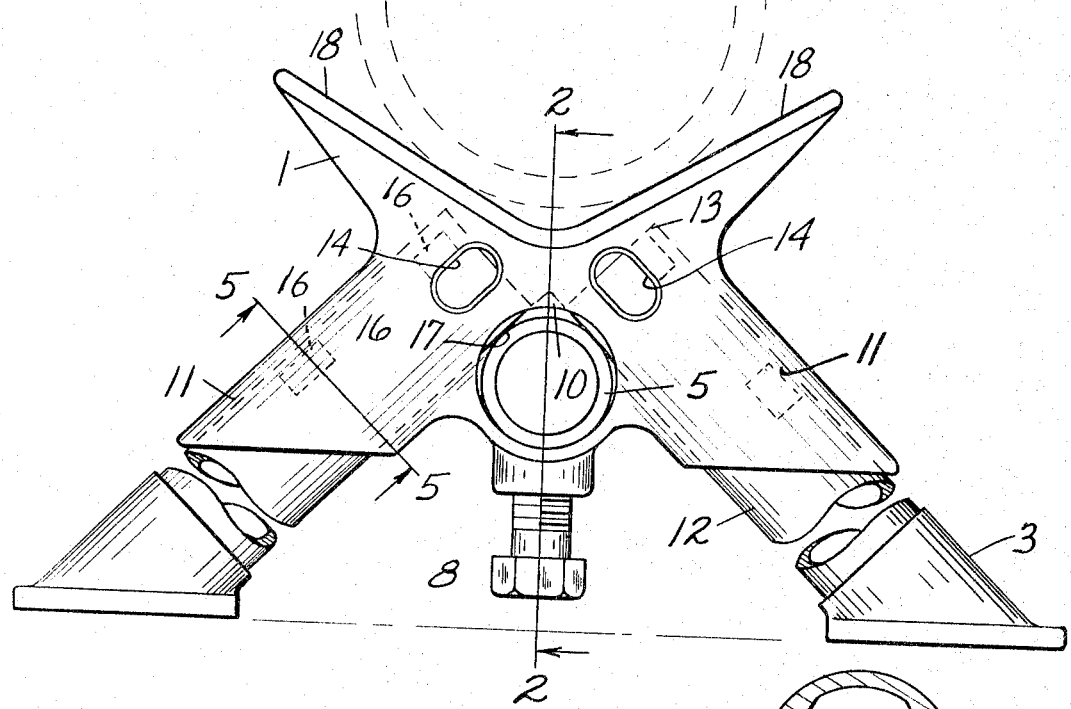
FIG. 1
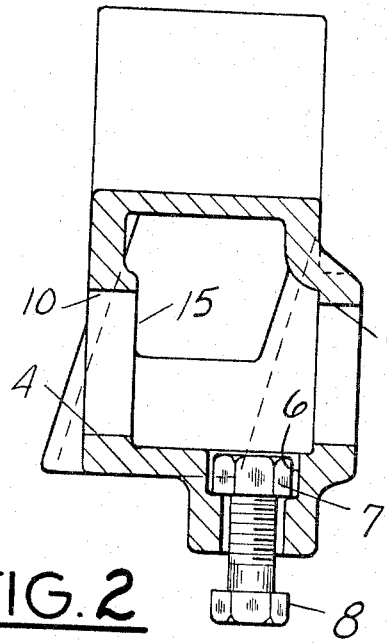
FIG. 2
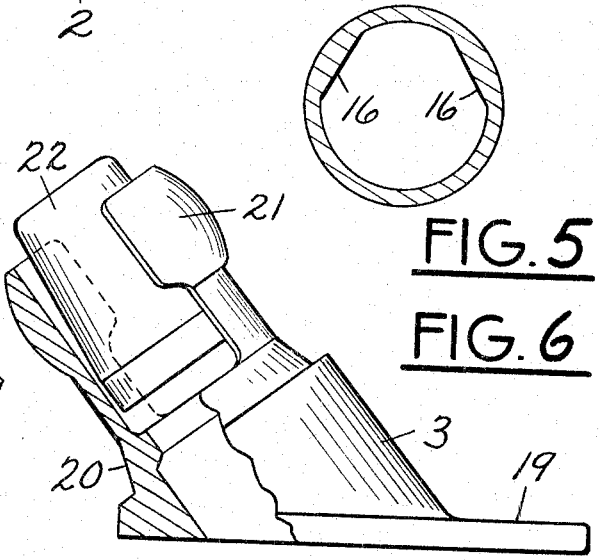
FIG. 5
FIG. 6
INVENTOR.
Thomas G. Brown
BY Ralph Hammar
Attorney April 18, 1967 T. G. BROWN 3,314,674
PIPE STAND
Filed Jan. 29, 1965 2 Sheets-Sheet 2
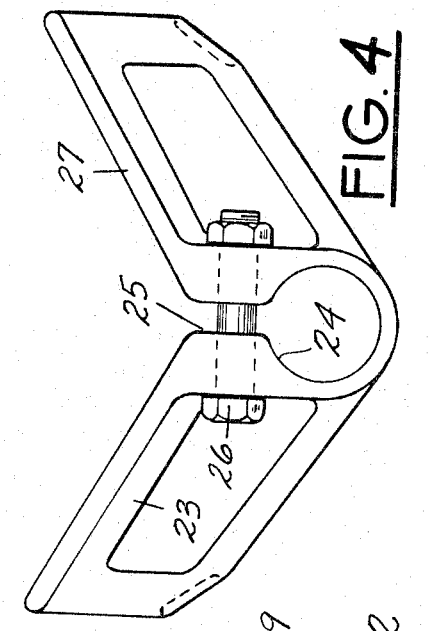
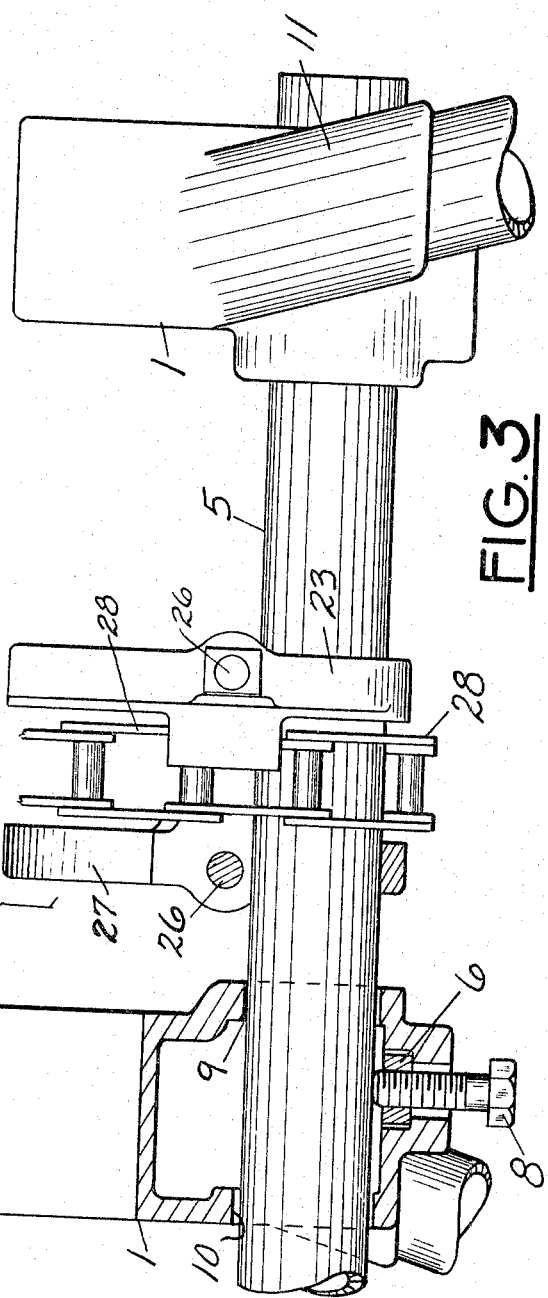
INVENTOR.
Thomas G. Brown
BY
Ralph Hammar
Attorney

United States Patent Office 3,314,674
Patented Apr. 18, 1967

3,314,674
PIPE STAND
Thomas G. Brown, Erie, Pa., assignor to Reed Manufacturing Company, Erie, Pa., a corporation of Pennsylvania
Filed Jan. 29, 1965, Ser. No. 428,925
1 Claim. (Cl. 269—296)

This invention is a pipe stand or support for holding pipe in position for performing cutting or machining operations. The support is adapted to asbestos-cement pipe and the like and can be quickly assembled and disassembled for ease in transportation.

In the drawing, FIG. 1 is an end view of a pipe stand, FIG. 2 is a longitudinal section through one of the brackets, FIG. 3 is a side elevation of the pipe stand partly in section, FIG. 4 is an end view of the pipe clamp base, FIG. 5 is a section on line 5—5 of FIG. 1, and FIG. 6 is an enlarged elevation partly broken away of one of the feet.

The principal parts of the pipe stand are two brackets 1, one for each end of the stand, a pipe clamp 2, and four feet 3.

The brackets 1 have a longitudinal or horizontal socket 4 receiving a horizontal pipe 5 which forms the structural connection between the brackets 1. At one end of the socket 4 is a recess 6 non rotatably receiving a nut 7 cooperating with a clamping screw 8 which when tightened forces the pipe 5 solidly up against a pivot surface 9 at one end of the socket 4. When the clamping screw 8 is tightened, the pipe 5 is solidly secured in its bracket and is pivoted about the surface 9. At the opposite end, the socket 4 is enlarged so that its upper surface 10 clears the pipe 5 when the clamping screw is tightened. This means that when the screw is tightened, the pipe 5 always bears against the surface 9.

On the under side of the bracket 1 are two downwardly diverging sockets 11, each of which receives a length 12 of pipe serving as one of the legs of the pipe stand. In end view, the sockets 11 are downwardly and outwardly inclined at a relatively large angle. In side view as shown in FIGS. 2 and 3 there is a lesser outward inclination of the sockets 11. The inclination of the sockets provides stability.

The upper ends of the legs 12 seat on shoulders 13 at the upper ends of the sockets 11. Windows 14 in the sides of the sockets 11 permit visual inspection of the seating of the legs on the shoulders. The inner or adjacent sides of the sockets 11 have openings 15 (FIG. 2) through which the upper ends of the legs 12 project into engagement with the horizontal pipe 5. From one aspect, the openings 15 are formed by intersection of the horizontal socket 4 with the diverging sockets 11. As the clamping screws 8 are tightened, the pipe 5 is forced upward and wedges the legs 12 outward against pads 16 on the side of the socket 11 opposite the opening 15. A clamping force is exerted by the pipe 5 on each of the legs 12 at point 17 wedging the legs solidly against the opposite side of the sockets 11. This clamping action results from the tightening of the clamping screws 8.

At the top of the brackets 1 are diverging pipe supports 18 inclined outwardly and upwardly from the center line of the pipe stand which serve as a cradle for pipe.

The brackets 1 may be castings and are usable in the as cast condition without any machining operations.

Each foot 3 has a flange 19 which rests on the supporting surface and a tapered shoulder 20 engaging the lower end of the pipe 12. Integral split fingers 21 telescope within the pipe 12 and are spread into gripping engagement by a wedge 22.

At some intermediate portion of the longitudinal pipe 5 is a chain clamp which pulls the pipe down against supporting surfaces 18. The clamp comprises a base 23 having a bore 24 slidably receiving the pipe 5 and having a longitudinal split 25 providing sufficient resilience so that the clamp base can be securely fixed to the pipe 5 by tightening bolts 26. Integral with the upper side of the clamp base on either side of the split 25 are plate-like surfaces 27 diverging upwardly and outwardly in the same manner as the surfaces 18. When the pipe is long enough to rest on both of the brackets 1, the surfaces 27 are slightly below the surfaces 18 of the brackets so that the pipe is supported entirely by the brackets. However, a short length of pipe will be supported by the surfaces 18 of one of the brackets and the surfaces 27 of the clamp base. The clamping of the pipe is by a chain 28 having opposite ends connected to a cross head 29. Opposite ends of the cross head are guided in a clamp yoke 30. A clamping screw 31 cooperates with the cross head to move it up and down to tighten and loosen the chain. One end of the chain 28 is usually fixed to the cross head while the other end has an adjustable connection so that the chain can be adjusted to grip various diameters of pipe.

In the assembly of the pipe stand, the upper ends of the legs 12 are inserted in sockets 11, the clamp base 23 clamped to the pipe 5 and the ends of the pipe 5 inserted in sockets 4. Tightening of the clamping screws 8 completes the assembly. If desired, the feet 3 are wedged into the lower ends of the legs.

In use, the pipe is cradled between the surfaces 18 of the brackets and clamped by tightening the chain 28.

What is claimed as new is:

A pipe stand bracket having upwardly and outwardly diverging surfaces forming a pipe supporting cradle, a pair of downwardly and outwardly diverging sockets on the under side of the bracket receiving the upper ends of legs, shoulders at the upper ends of said sockets for seating the upper ends of the legs, a horizontal socket in the bracket between and below the diverging sockets for receiving a horizontal pipe, said horizontal socket intersecting the diverging sockets and providing openings through which the horizontal pipe projects into the diverging sockets into engagement with the upper end of the legs, a vertical set screw in the bracket below the horizontal pipe and horizontally spaced along the length of said horizontal socket from said pair of sockets for forcing the horizontal pipe upward against the upper ends of the legs.

References Cited by the Examiner
UNITED STATES PATENTS

| | | | |
|---|---|---|---|
| 1,408,675 | 4/1922 | Wimberg | 269—296 |
| 1,458,738 | 6/1923 | Teeken | 269—296 |
| 1,798,340 | 3/1931 | Thewes | 269—296 |
| 2,989,142 | 6/1961 | Gill | 269—296 |
| 3,216,752 | 11/1965 | Rifken | 287—54 |

RICHARD H. EANES, JR., *Primary Examiner.*